(12) United States Patent
Ghulam

(10) Patent No.: US 8,102,539 B2
(45) Date of Patent: Jan. 24, 2012

(54) METHOD FOR MEASURING A GAP BETWEEN A MULTIBLADED ROTATABLE MEMBER AND A SURROUNDING HOUSING

(75) Inventor: Younas Ghulam, Nottingham (GB)

(73) Assignee: Rolls-Royce PLC, London (GB)

( * ) Notice: Subject to any disclaimer, the term of this patent is extended or adjusted under 35 U.S.C. 154(b) by 312 days.

(21) Appl. No.: 12/457,783

(22) Filed: Jun. 22, 2009

(65) Prior Publication Data

US 2010/0046008 A1    Feb. 25, 2010

(30) Foreign Application Priority Data

Aug. 20, 2008   (GB) .................................. 0815139.1

(51) Int. Cl.
*G01B 11/14* (2006.01)
(52) U.S. Cl. ........................................ 356/614; 356/625
(58) Field of Classification Search .............. 9/614–625; 356/614–625
See application file for complete search history.

(56) References Cited

U.S. PATENT DOCUMENTS

| | | | |
|---|---|---|---|
| 4,395,827 A * | 8/1983 | Stowe et al. | 33/655 |
| 4,659,988 A | 4/1987 | Goff et al. | |
| 5,627,761 A | 5/1997 | Pollard | |
| 7,916,311 B2 * | 3/2011 | Corn et al. | 356/625 |
| 2008/0218181 A1 | 9/2008 | Ducheminsky et al. | |

FOREIGN PATENT DOCUMENTS

GB    2 112 080 A    7/1983

* cited by examiner

*Primary Examiner* — Gregory J Toatley
*Assistant Examiner* — Tara S Pajoohi
(74) *Attorney, Agent, or Firm* — Oliff & Berridge, PLC

(57) ABSTRACT

A method for measuring the gap between a multibladed rotatable member and a surrounding housing in a gas turbine engine. In accordance with the method, a blade is removed from the rotatable member and replaced by a distance measuring clearance probe. The distance from the probe to the housing is then measured at a number of axial positions of the rotatable member.

10 Claims, 4 Drawing Sheets

METHOD FOR MEASURING A GAP BETWEEN A MULTIBLADED ROTATABLE MEMBER AND A SURROUNDING HOUSING

BACKGROUND

This invention concerns a measurement method, and particularly a method for measuring the gap between a multibladed rotatable member and a surrounding housing, and especially a method for measuring such gaps in a gas turbine engine.

This invention relates particularly to measuring the clearance between multibladed rotatable members and a surrounding housing in a gas turbine engine. The clearance gaps being measured could be any of the gap between a fan rotor path lining and a fan blade tip; the gap between a compressor seal segment and compressor blade tips; or the gap between a turbine seal segment and turbine blade fins.

During assembly and also maintenance of gas turbine engines such as used for example in aircraft, it is important to measure these clearances. Variations in clearance may be encountered due to wear and oxidation of particular segments, for instance in the lining of compressors and turbines. Also, the blades may be of different lengths and/or profiles.

Previously such clearances may have been measured by removing the respective rotor or rotors, and using a static or portable coordinate measuring machine, which is a quite time consuming operation. For instance, it may be necessary to remove a number of casings to permit removal of the rotor or rotors, and then to replace the casings to enable the measurement to be carried out. The process must then be repeated to allow the rotor to be replaced.

Not all coordinate measuring machines have a sufficient resolution to carry out such work. For instance, in a gas turbine jet engine the compressor requires an axial scan of the lining at sixteen circumferential positions on each stage of the rotor path, with an axial resolution of every 0.1 mm or better.

Fan tip clearances have been measured by measuring the gap directly and hand positioning the fan blade forwards and outwards, and measuring the gap between the blade and the casing.

SUMMARY

According to a first aspect of the invention there is provided a method for measuring the gap between a multibladed rotatable member and a surrounding housing, the method including removing a blade from the rotatable member and locating a distance measuring clearance probe on the rotatable member in place of the blade, and measuring the distance from the probe to the housing at a number of axial positions of the rotatable member.

According to a second aspect of the invention there is provided a method for measuring the gap between a rotatable member and a surrounding housing, the method including removing the rotatable member from the housing, and replacing it with an alternative rotatable member bearing a distance measuring clearance probe, and measuring the distance from the probe to the housing at a number of axial positions of the alternative rotatable member.

The method may include measuring the distance to the housing during rotation of the rotatable member.

The clearance probe may be in the form of a laser measuring device.

The rotatable member may be any of a fan rotor, compressor rotor or turbine rotor, with the blade being respectively any of a fan blade, compressor blade or turbine blade.

The clearance probe may be arranged to provide radio data transfer during use.

The method may also include measuring the blade tip profiles by locating a distance measuring tip probe in the housing or a dummy housing, rotating the rotatable member past the tip probe, and measuring the distance therefrom to the rotatable member.

The tip probe may be in the form of a laser measuring device.

The tip probe may be arranged to provide radio data transfer during use.

A plurality of tip probes may be provided in the housing or a dummy housing, spaced in use across the width of the blade tip, for providing multiple measurements thereacross.

The values recorded by the clearance and tip probes may be compared, to provide maximum, minimum and mean gap sizes.

The invention also provides a method for measuring the gap between a multibladed rotatable member and a surrounding housing in a gas turbine engine, the method being according to any of the preceding eleven paragraphs.

BRIEF DESCRIPTION OF THE DRAWINGS

Embodiments of the present invention will now be described by way of example only and with reference to the accompanying drawings, in which.

DETAILED DESCRIPTION OF EMBODIMENTS

Figure 1:
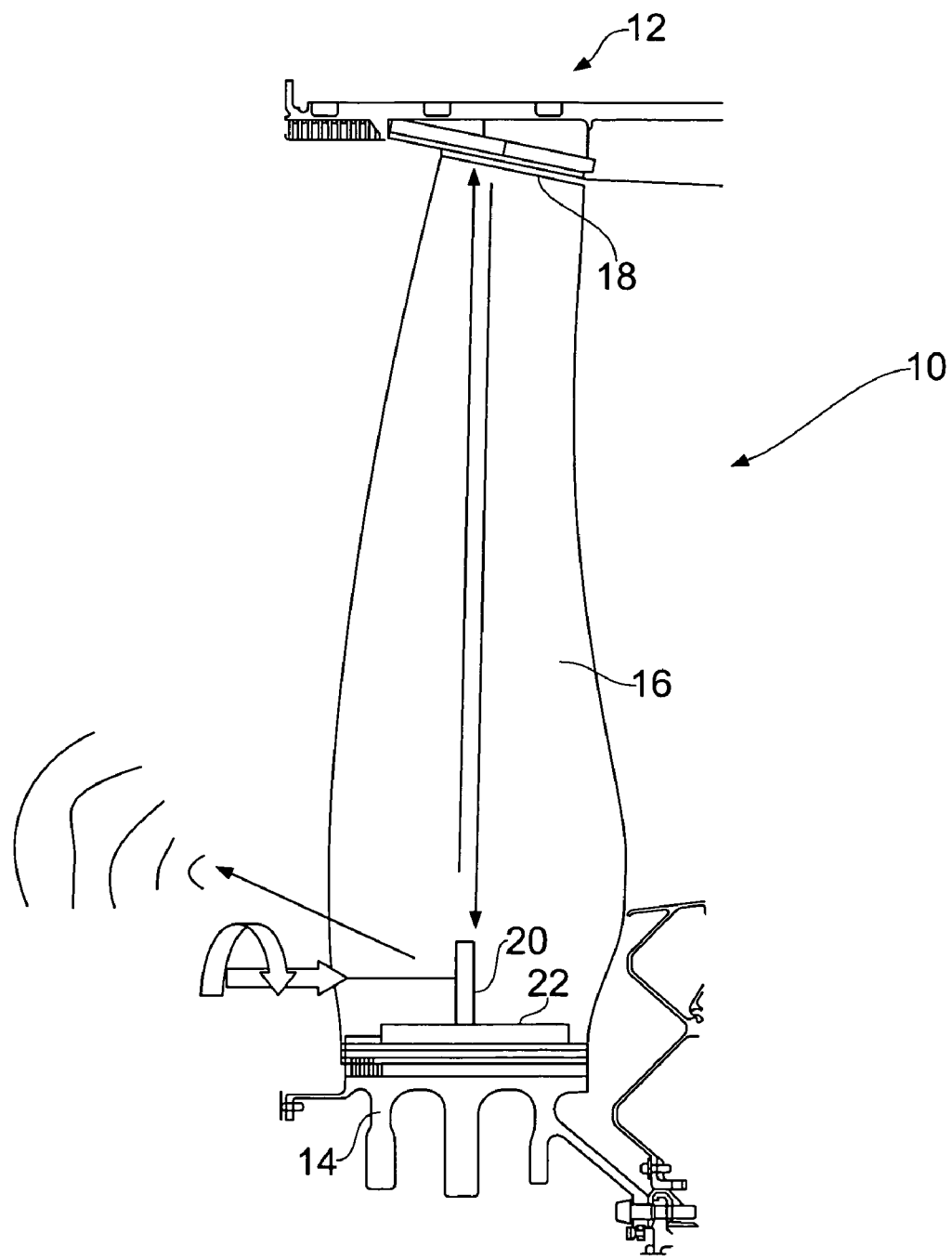
FIG. 1 is a sectional circumferential sectional view through part of a fan of a gas turbine engine showing a first method according to the invention being carried out.
Figure 2:
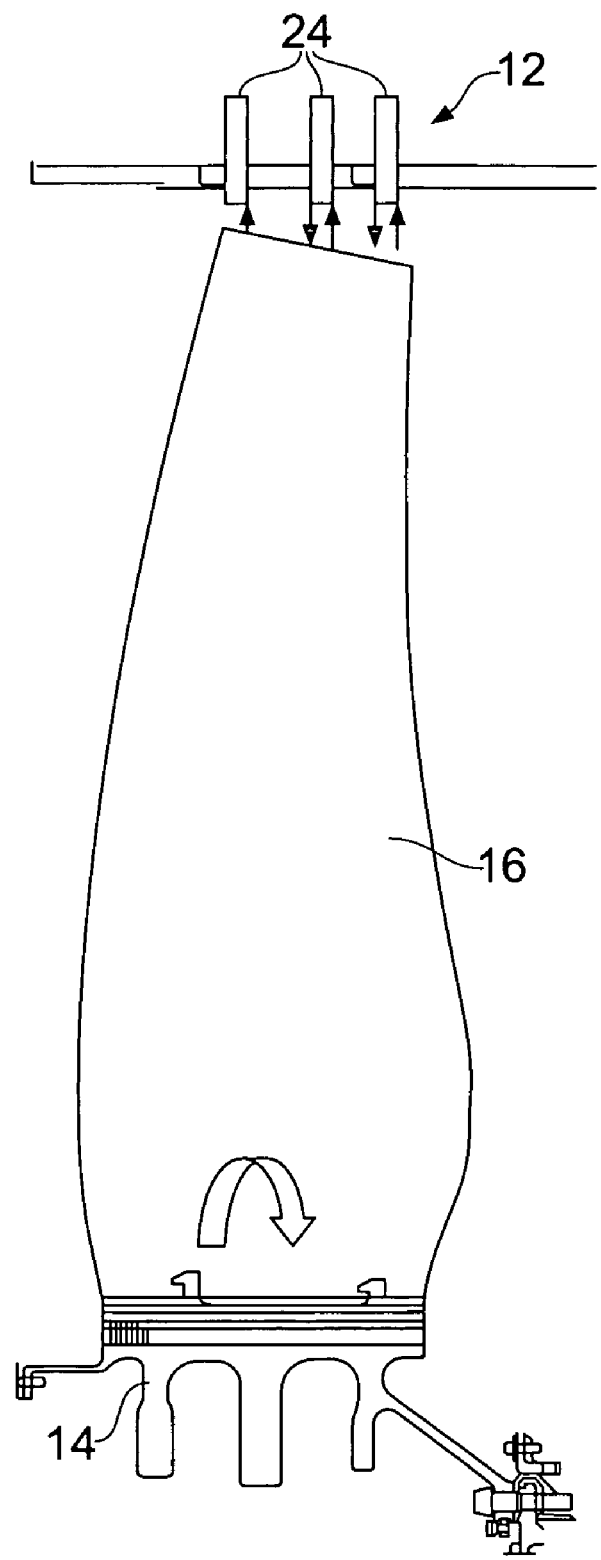
FIG. 2 is a similar view to FIG. 1 showing a further part of the first method being carried out.

FIGS. 1 and 2 show part of a fan assembly 10 with a fan case 12 which contains a fan rotor 14 which mounts circumferentially therearound a plurality of fan blades 16. The clearance gap between the case 12 and fan blades 16 is shown at 18.

To measure the gap 18 during construction or maintenance, a one of the fan blades 16 is removed from the rotor 14 and a probe 20 in the form of a laser system is mounted on the rotor 14 by a dummy blade or root fixing 22. The distance to the fan case 12 from the probe 20 is measured as the rotor 14 is rotated. The probe 20 may be wireless to utilise radio data transfer to transfer data to a data storage unit (not shown).

FIG. 2 illustrates a method for determining the profile of the tips of the blades 16. Three probes 24 again in the form of laser systems are mounted in the case 12 or a similar dummy casing (balancing rig) so as to locate adjacent the tip of the blades 16 as the rotor 14 is rotated. The probes 24 are also connected, and probably by a wireless arrangement, to the data storage unit.

The data from the probes 20, 24 is combined using software to calculate the gap 18 across the tip of the blades 16, to provide for instance maximum, minimum and mean values.

Figure 5:
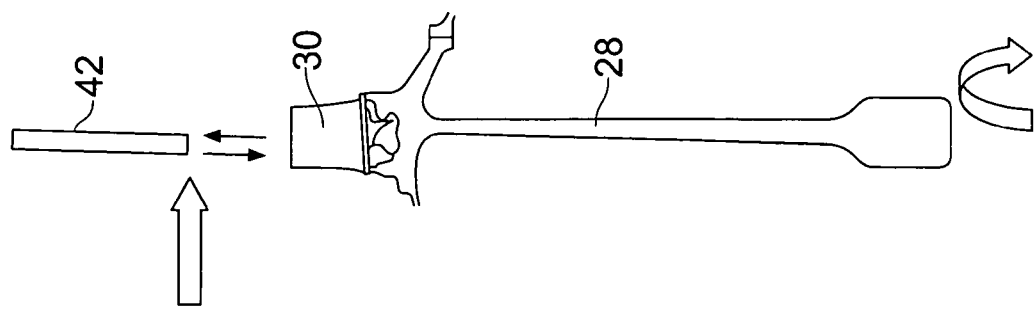
FIGS. 4 and 5 are similar views to FIG. 3 showing different parts of the second method being carried out.
Figure 4:
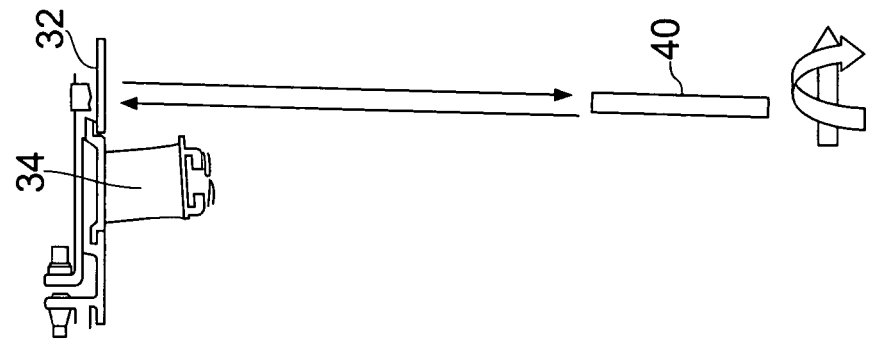
Figure 3:
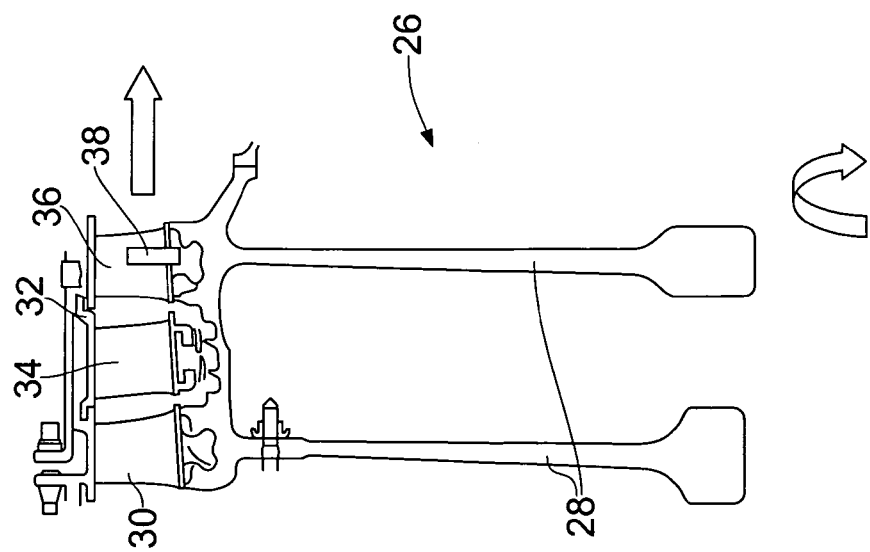
FIG. 3 is a diagrammatic circumferential sectional view through part of a fan case of a gas turbine engine showing a second method according to the invention being carried out.

FIGS. 3 to 5 show part of a compressor assembly 26 of a gas turbine engine. The compressor includes a rotor (not shown) which mounts a plurality of discs 28. Each disc 28 mounts a plurality of radially outwardly extending blades 30. The compressor 26 includes a casing 32 with a gap between the rotatable blades 30 and the casing 32. The rotatable blades 30 are interspersed in adjacent discs 28 by stators 34 mounted on the casing 32.

FIG. 3 shows a compressor assembly 26 where a conventional blade 30 has been replaced by a blade 36 which locates a wireless laser probe 38 for measuring the location of the blade 36 relative to the casing 32, and thus providing a datum.

FIG. 4 shows a one of the discs 28 having been removed and replaced by a wireless laser probe 40 which measures the distance from the rotor to the compressor casing 32.

FIG. 5 shows a further probe 42 which has been mounted to a dummy casing (balancing rig) or casing 32. The probe 42 measures the distance to the tips of the rotating blades 30 in a similar manner to the probes 24 described above. Again data from the probes 38, 40 and 42 will be compared to calculate the gaps between the tips of the rotatable blades 30 and the casing 32, to provide for instance maximum, minimum and mean values for the different blades 30 during rotation.

Figure 8:
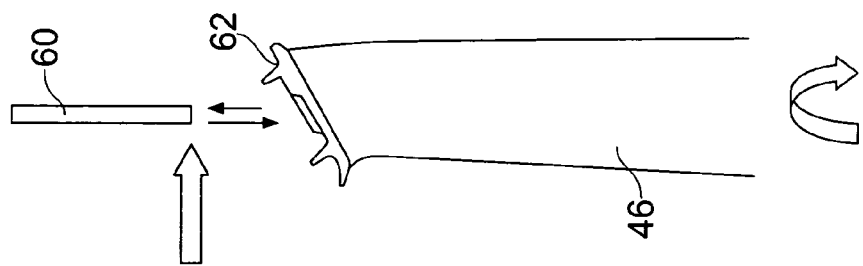
FIGS. 7 and 8 are similar views to FIG. 6 showing further parts of the third method being carried out.
Figure 6:
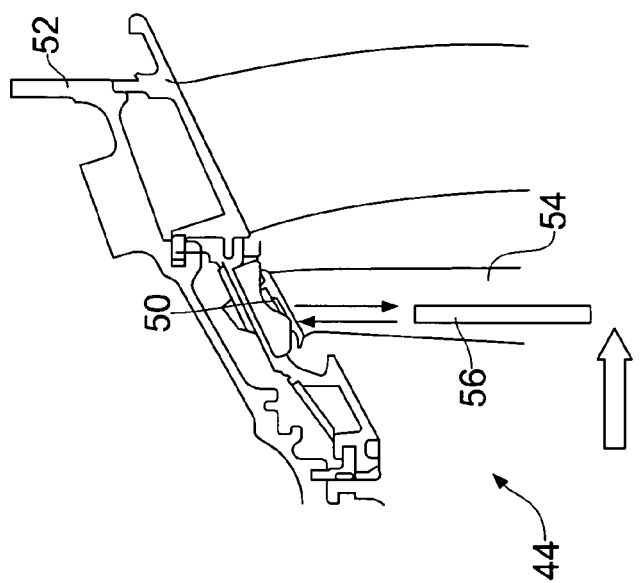
FIG. 6 is a diagrammatic circumferential sectional view through part of a turbine of a gas turbine engine showing a third method according to the invention being carried out.
Figure 7:
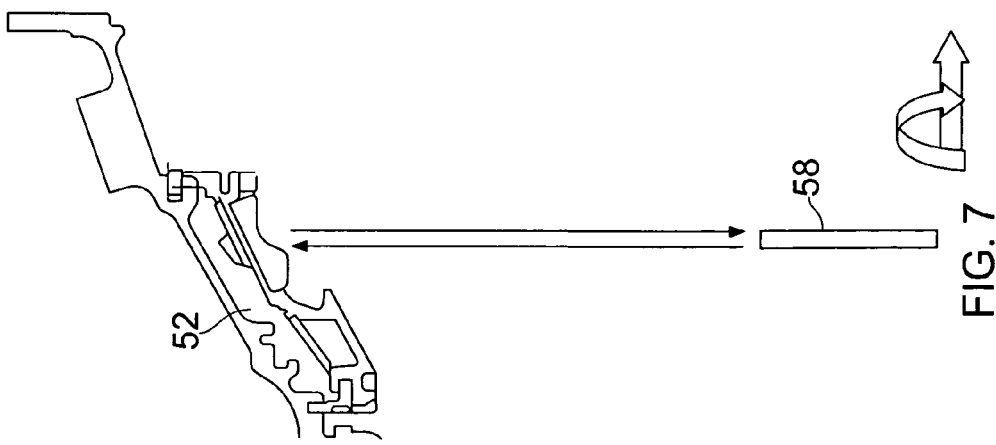

FIGS. 6 to 8 show a turbine assembly 44 of a gas turbine engine again with a plurality of blades 46 attached by discs to a rotor (both not shown). A gap 50 is provided between the blades 46 and a turbine casing assembly 52.

FIG. 6 shows where a blade 46 has been removed and replaced by a blade 54 which locates a wireless laser probe 56 for measuring the location of the blades 54 relative to the casing assembly 52, and thus providing a datum FIG. 7 shows a situation where turbine blades 46 have been removed and a probe 58 has been mounted on the respective disc for measuring the distance to the casing 52.

FIG. 8 shows a further probe 60 located in the casing 52 or on a fixture for measuring the distance to the tips 62 of the blades 46 to measure the tip profiles. Again the data received from the probes 56, 58 and 60 can be compared to provide an indication of the maximum, minimum and mean values of the tip gaps around the turbine 44.

There are thus described methods for providing repeatable processes for measuring the blade tip gaps in the fans, compressors and turbines of a gas turbine engine. These methods are repeatable and significantly less time consuming than existing arrangements. The methods are therefore more efficient and more reliable for measuring tip clearances. These systems permit 3D topography for seal surfaces and blade clearances to be obtained.

Various modifications may be made without departing from the scope of the invention. For instance the method may be usable in other parts of a gas turbine engine. Other types of probes may be usable, and these could be hard wired in particular situations.

The invention claimed is:

1. A method for measuring a gap between a multibladed rotatable member and a surrounding housing, the method comprising:
   removing a blade from the multibladed rotatable member and locating a distance measuring clearance probe on the multibladed rotatable member in place of the blade, and
   measuring the distance from the clearance probe to the housing at a number of axial positions of the multibladed rotatable member.

2. The method of claim 1, wherein the method includes measuring the distance to the housing during rotation of the multibladed rotatable member.

3. The method of claim 1, wherein the clearance probe is in the form of a laser measuring device.

4. The method of claim 1, wherein the multibladed rotatable member is any of a fan rotor, compressor rotor or turbine rotor, with the blade being respectively any of a fan blade, compressor blade or turbine blade.

5. The method of claim 1, wherein the clearance probe is arranged to provide radio data transfer during use.

6. The method of claim 1, wherein the method also includes measuring the blade tip profiles by locating a distance measuring tip probe in the housing or a dummy housing, rotating the multibladed rotatable member past the tip probe, and measuring the distance therefrom to the multibladed rotatable member.

7. The method of claim 6, wherein the tip probe is in the form of laser measuring device.

8. The method of claim 6, wherein the tip probe is arranged to provide radio data transfer during use.

9. The method of claim 6, wherein a plurality of tip probes are provided in the housing or a dummy housing, spaced in use across the width of the blade top, for providing multiple measurements thereacross.

10. The method of claim 6, wherein the values recorded by the clearance and tip probes are compared, to provide maximum, minimum and mean gap sizes.

* * * * *